Figure 1:
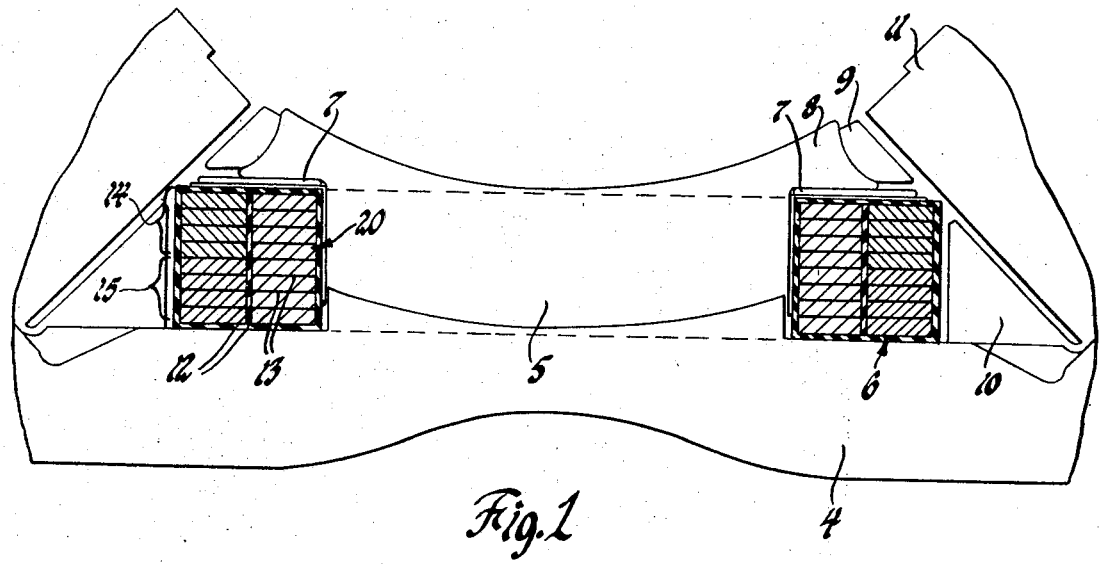

United States Patent

[11] 3,566,171

[72] Inventors Henry F. Tichy
Clarendon Hills;
Walter Drabik, Downers Grove, Ill.
[21] Appl. No. 6,887
[22] Filed Jan. 29, 1970
[45] Patented Feb. 23, 1971
[73] Assignee General Motors Corporation
Detroit, Mich.

[54] MAIN FIELD COIL FOR RAILWAY TRACTION MOTOR
7 Claims, 2 Drawing Figs.
[52] U.S. Cl. ............................................... 310/180,
310/184, 310/201
[51] Int. Cl. ........................................................ H02k 3/00
[50] Field of Search ........................................... 310/180, 4,
201, 208, 269

[56] References Cited
UNITED STATES PATENTS
2,071,977 2/1937 Herrick ...................... 310/208
Primary Examiner—D. X. Sliney
Attorneys—Frank J. Soucek and Charles R. Engle ABSTRACT: A coil assembly having first and second outer windings and a third inner winding electrically connected in series. The outer windings have approximately one-half the number of turns of the inner winding. The outer windings are identically wound and each has an outwardly extending terminal. By turning one winding over during the assembly process both outwardly extending terminals will protrude from the coil assembly substantially midway between the upper and lower surfaces of the assembly.

PATENTED FEB 23 1971                                3,566,171

INVENTORS
Henry F. Tichy, &
Walter Drabik
BY J. F. Soucek
ATTORNEY

MAIN FIELD COIL FOR RAILWAY TRACTION MOTOR

The present invention is generally directed to a coil assembly for a dynamoelectric machine, and more particularly directed to a main field coil winding for a railway traction motor.

The main field coil for a traction motor in accordance with the present invention consists of an inner eight (8) turn coil and two outer coils having four (4) turns each. One of the outer coils is rotated 180° during assembly, to permit corresponding surfaces having outwardly or free extending terminals to be positioned such that the free terminals extend intermediate the surfaces of the coil assembly to thereby reduce the possibility of grounding between the main pole or frame of the motor, and the coil assembly.

One object of the present invention is to provide a three part coil assembly wherein the coils are prewound and assembled such that the coil assembly is less susceptible to electrical grounding than a conventional single winding coil.

A further object of the present invention is to provide a three winding coil assembly wherein two of the windings are identically bench wound.

Another object of the present invention is to provide a main field coil winding for a traction motor wherein the terminal ends of the coil are disposed intermediate the surfaces of the winding to minimize the possibility of a ground between the terminals and the main pole or frame of the motor.

Another object is to provide positive clamping of all coil turns between the pole and frame.

Another object is to present the maximum number of coil turns to the cooling air.

Figure 2:
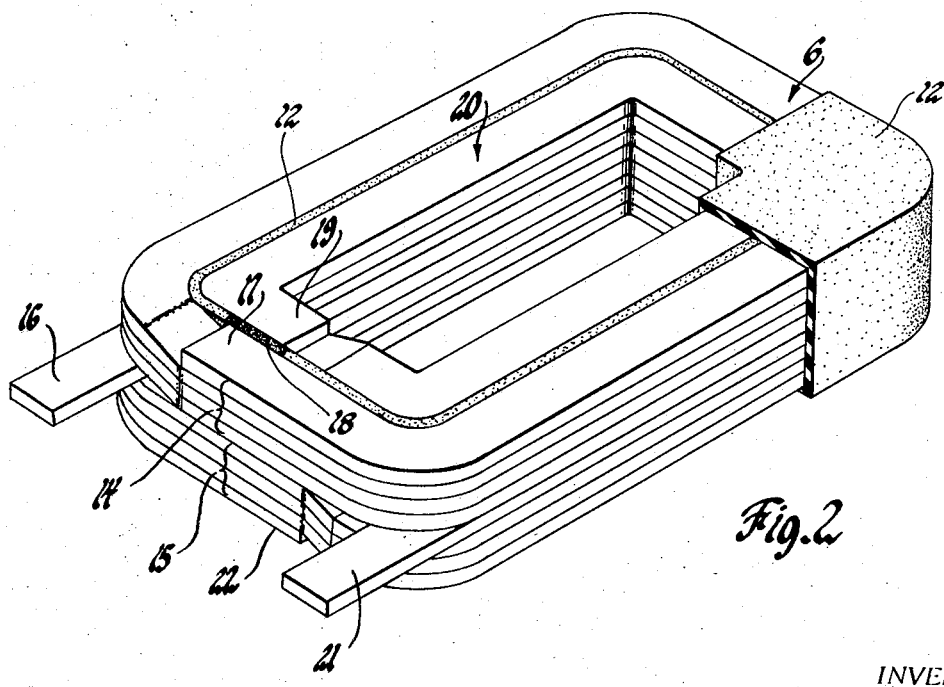

The above and other objects will become more apparent when the following specification is read in connection with the accompanying drawing wherein:

FIG. 1 is a partial elevational view, partly in section, of a traction motor embodying the present invention; and FIG. 2 is a perspective view of the coil assembly of the present invention.

Referring now to FIG. 1 a motor frame 4 has a main pole 5 secured thereto by one or more bolts not shown. Positioned on the frame and surrounding the main pole 5 is a main field coil assembly 6 constructed in accordance with the present invention. A wide heavy gauge nonmagnetic steel washer 7 clamps the coil assembly 6 between the pole piece ear 8 and the frame 4 and transmits the clamping load over both columns (inner and outer turns) of the coil. Air baffles 9, 10 are interposed between an interpole 11 and the coil, main pole and frame of the motor.

Silicon rubber insulation 12 surrounds the inner and outer turns of the coil assembly 6 and mica plate insulation 13 is positioned between each layer of the coil windings.

Referring now to FIG. 2, the coil assembly 6 includes a first and second winding 14, 15 of copper strap material. Winding 14 consists of 4 turns and has a first terminal 16 adapted to be connected to a source of power (not shown), and a second terminal 17 electrically connected by brazing as indicated at 18 to a first terminal 19 of a third inner coil 20. Inner coil 20 consists of 8 turns of copper strap material and has a second terminal on its lower surface substantially in alignment with terminal 19.

The second outer winding 15 consists of 4 turns of copper strap material and has a first terminal 21 adapted to be connected to a source of power and a second terminal 22 electrically connected by brazing to the second terminal of winding 20 in a manner identical to that shown for terminals 17 and 19.

It is seen that coils 14 and 15 each consist of four turns and may be bench wound in an identical manner. The inner peripheral dimensions of these coils are shown to be substantially equal to the outer peripheral dimension of the inner coil 20.

In manufacturing the coil assembly one of the outer coils 14 or 15 is turned over so that terminals 16 and 21, that are adapted to be connected to a source of power, lie in substantially the same plane intermediate the top and bottom surfaces of the coil assembly. The inner coil 20 may then be placed inside of the outer coils with insulation 12 therebetween and the ends or terminals 17, 22 of the outer coils are brazed to the terminals of the inner coil. It can be seen that a series coil assembly is provided beginning with terminal 16 to terminals 17, 19, the lower terminal (not shown) of the inner coil, terminal 22 and terminal 21.

Certain advantages are believed obvious from the above description. For example, each lateral turn of the inner coil transmits heat inwardly to the pole piece iron and also outwardly to the outer windings which radiate heat rapidly toward the outmost air scrubbed surface;

The coil is securely clamped by means of a nonmagnetic washer between the main pole and the frame of the motor; and The lead insulating system is greatly simplified since both power leads are centrally located on the outer windings without any crossover and are far removed from the grounded frame.

While a preferred embodiment of this invention has been described it is intended that the appended claims cover such modifications as come within the spirit and scope of the invention.

We claim:

1. A coil assembly including a first, second and third winding, said first and second windings each having a first terminal adapted to be connected to a source of power and a second terminal connected to the ends of said third winding, said third winding having an outer peripheral dimension that is substantially equal to the inner peripheral dimensions of said first and second windings, said first and second windings encircling said third winding and having corresponding surfaces adjacent each other whereby said first terminals extend outwardly from said coil and are positioned intermediate the upper and lower surfaces of said coil.

2. A coil assembly as defined by claim 1 wherein said second terminals of said first and second winding are brazed to said ends of said third winding whereby said three windings are electrically connected in series.

3. A coil assembly as defined by claim 1 wherein the sum of the number of turns in said first and second windings equals the total number of turns is said third winding.

4. A coil assembly as defined by claim 1 wherein said windings are formed from copper straps of substantially rectangular cross section and wherein the surfaces of said windings are substantially rectangular.

5. A main field coil assembly for a traction motor, said coil being formed from flat copper strap of rectangular cross section and having two outer windings and an inner winding, each of said outer windings having a predetermined number of turns and said inner winding having a number of turns equal to the sum of the turns of said outer windings whereby said inner winding has substantially twice the depth of either of said outer windings, each of said outer windings having first and second terminals with said first terminals extending outwardly beyond the periphery of said outer windings and being adapted to be connected to a source of electrical power, said inner winding having an upper and a lower terminal, means electrically connecting one of said second terminals to said upper terminal of said inner winding and means connecting said other of said second terminals to said lower terminal of said inner windings such that said first terminals are positioned intermediate the surfaces of said assembly.

6. A method for manufacturing a coil assembly comprising the steps of forming a first coil having a predetermined number of turns, forming a second coil substantially identical to said first coil, forming a third coil having a number of turns equal to the sum of the turns of said first and second coils, placing said third coil within said first and second coils with a pair of corresponding surfaces of said first and second coils being adjacent each other, electrically connecting one end of said first coil to one end of said third coil, and electrically connecting one end of said second coil to the other end of said third coil.

7. A method for manufacturing a coil assembly as described in claim 6 wherein said last two steps of electrically connecting said coils comprise the brazing of said ends of said first and second second coils to the ends of said third coil.